(12) United States Patent  (10) Patent No.: US 8,441,671 B2
Elliot et al.  (45) Date of Patent: May 14, 2013

(54) DYNAMIC MODULE CONFIGURATION IN A CONTROLLER AREA NETWORK (CAN) WITH FIXED SUB-MODULE BOARD IDENTIFICATION AND PLUG-N-PLAY SUPPORT

(75) Inventors: Michael William Elliot, Macedon, NY (US); Timothy James Garwood, Rochester, NY (US); Michael Joseph Dahrea, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 455 days.

(21) Appl. No.: 12/771,123

(22) Filed: Apr. 30, 2010

(65) Prior Publication Data

US 2011/0267644 A1 Nov. 3, 2011

(51) Int. Cl.
*G06F 3/12* (2006.01)

(52) U.S. Cl.
USPC .......... 358/1.15; 709/205; 709/208; 709/216; 709/221; 709/231; 710/10; 710/23; 710/104; 710/110; 711/5

(58) Field of Classification Search ................. 358/1.15; 719/313, 321, 322, 329; 715/735, 760; 709/205, 709/208, 216, 221, 231
See application file for complete search history.

(56) References Cited

U.S. PATENT DOCUMENTS

| 5,592,881 | A | 1/1997 | Rabjohns |
| 7,307,994 | B2 | 12/2007 | Kurita |
| 2004/0030969 | A1* | 2/2004 | Kuramochi et al. .......... 714/712 |
| 2006/0294290 | A1 | 12/2006 | Raker et al. |
| 2007/0055976 | A1* | 3/2007 | Ward et al. .................... 719/329 |
| 2007/0285713 | A1 | 12/2007 | Yamamoto et al. |
| 2010/0149584 | A1* | 6/2010 | Cech et al. ................... 358/1.15 |

* cited by examiner

*Primary Examiner* — Benny Q Tieu
*Assistant Examiner* — Juan M Guillermety
(74) *Attorney, Agent, or Firm* — Ronald E. Prass, Jr.; Prass LLP (57) ABSTRACT

According to aspects of the embodiments, there is provided methods and systems for configuring modules and sub-modules in a control area network (CAN) of a printer system using machine data and network protocols. The machine data includes a file that describes the board types and application types for possible modules and sub-modules of a printer system. The machine data facilitates the process of identifying modules and the process of differentiating sub-module boards from other modules. Customization of printer configurations is enhanced through plug-and-play support allowing for dynamic sub-module re-configuration for the disconnection and reconnection of boards that may form part of replaceable units. A configuration process allows non-configured boards to be placed, when the printer system is idle, properly into the network and to be associated with the proper module.

15 Claims, 7 Drawing Sheets

| NODE | NODE ID | SLOTS IN USE | SLOT 1 | SLOT 2 | SLOT 3 | SLOT 4 |
|---|---|---|---|---|---|---|
| MASTER CONTROLLER | 0 Hex | 0 | ------ | ------ | ------ | ------ |
| PAPER FEEDER | 1 Hex | 4 | 0 Hex | 1 Hex | 2 Hex | 3 Hex |
| IMAGING UNIT | 2 Hex | 2 | 0 Hex | 2 Hex | EMPTY | EMPTY |
| DOCUMENT FINISHER | 3 Hex | 4 | 1 Hex | 0 Hex | 2 Hex | 3 Hex |
| POST PROCESS INSERTER | 2F Hex | 3 | 3 Hex | 0 Hex | 3 Hex | EMPTY |

FIG. 4

```xml
<?xml version="1.0" encoding="UTF-8"?>
<CANGraph>
<SubBoardIdBits>3</SubBoardIdBits>
<Modules>
<Module>
<ModuleTypeName>Feeder</ModuleTypeName>
<ModuleConfigurations>
<ModuleConfiguration>
<ConfigurationName>Four-Tray</ConfigurationName>
<MainBoard>
<AppType>1</AppType>
<BoardType>11</BoardType>
<BoardName>SomeBoard</BoardName>
<SubBoardId>1</SubBoardId>
<FirmwareExe>SomeBoard.hex</FirmwareExe>
</MainBoard>
</ModuleConfiguration>
<ModuleConfiguration>
<ConfigurationName>Two-Tray</ConfigurationName>
<MainBoard>
<AppType>2</AppType>
<BoardType>11</BoardType>
<BoardName>SomeBoard</BoardName>
<SubBoardId>1</SubBoardId>
<FirmwareExe>SomeBoard.hex</FirmwareExe>
</MainBoard>
</ModuleConfiguration>
</ModuleConfigurations>
</Module>
<Module>
<ModuleOrdering>
<DownstreamPort>0</DownstreamPort>
<UpstreamPort>1</UpstreamPort>
</ModuleOrdering>
<SubBoards>
<SubBoard>
<AppType>0</AppType>
<BoardType>19</BoardType>
<BoardName>StationController</BoardName>
<SubBoardId>2</SubBoardId>
<FirmwareExe>StationController.hex</FirmwareExe>
<Optional>false</Optional>
</SubBoard>
<SubBoard>
<AppType>0</AppType>
<BoardType>19</BoardType>
<BoardName>XMC2</BoardName>
<SubBoardId>2</SubBoardId>
<FirmwareExe>StationController.hex</FirmwareExe>
<Optional>false</Optional>
</SubBoard>
<SubBoard>
<AppType>0</AppType>
<BoardType>19</BoardType>
<BoardName>XMC3</BoardName>
<SubBoardId>3</SubBoardId>
<FirmwareExe>StationController.hex</FirmwareExe>
<Optional>true</Optional>
</SubBoard>
</SubBoards>
</ModuleConfiguration>
</ModuleConfigurations>
</Module>
</Module>
```

DYNAMIC MODULE CONFIGURATION IN A CONTROLLER AREA NETWORK (CAN) WITH FIXED SUB-MODULE BOARD IDENTIFICATION AND PLUG-N-PLAY SUPPORT

BACKGROUND

The field of the present invention relates generally to a printing system with control area network (CAN) devices and subsystems, and more particularly to intelligent nodes that provide common software and hardware interfaces for such devices and subsystems.

Current designs of printing systems may incorporate modules, such as microcontrollers, to control, monitor, and/or provide other functionality to the printing systems. These modules allow the printing systems to have extensible printer configurations. The function of a module is determined by the program code that is programmed into the module. Such program code programmed into a module is known as firmware. In the past, it was necessary to remove the module from the system and either replace it with a new module containing the modified program code, or re-program the module with the modified program code and replace it into the system. This was an expensive and time consuming process, especially in large systems that include multiple modules. More recently, it has become feasible to program or re-program modules that are installed in systems without removing the modules from the systems. Each module is individually programmed with its own firmware.

Some existing related systems employ a Controller Area Network (CAN) or control area network (CAN) communication standard to couple the modules into a network. In CAN networked and extensible printer configurations an auto-configuration process determine what modules exist, how many, and in what order. Each module is then assigned a unique bus identifier (CAN-ID) by a central controller board for conducting communication between the modules. However, CAN network protocol does not provide association information to help determine which sub-boards belong to which module. In fact, in CAN network protocol sub-boards are treated as modules and are assigned a CAN-id. This treatment of sub-boards as modules causes the Main Controller to be involved with sub-boards that require very low-level control and would be better suited for localized control For the reasons stated above, and for other reasons stated below which will become apparent to those skilled in the art upon reading and understanding the present specification, there is a need in the art for printing systems with extensible configurations to dynamically accept boards and to facilitate inter-module communication.

SUMMARY

The disclosure relates to method and system for configuring modules and sub-modules in a control area network (CAN) of a printer system using machine data and network protocols. The machine data includes a file that describes the board types and application types for possible modules and sub-modules of a printer system. The machine data facilitates the process of identifying modules and the process of differentiating sub-module boards from other modules. Customization of printer configurations is enhanced through plug-and-play support allowing for dynamic sub-module re-configuration for the disconnection and reconnection of boards that may form part of replaceable units. A configuration process allows non-configured boards to be placed, when the printer system is idle, properly into the network and to be associated with the proper module.

BRIEF DESCRIPTION OF THE DRAWINGS

FIG. 5 is a diagram illustrating an XML machine data file in accordance to an embodiment;

DETAILED DESCRIPTION

While the present invention will be described in connection with preferred embodiments thereof, it will be understood that it is not intended to limit the invention to that embodiment. On the contrary, it is intended to cover all alternatives, modifications and equivalents as may be included within the spirit and scope of the invention as defined by the appended claims.

Aspects of the disclosed embodiments relate to method, system, and computer program to configure modules and sub-modules in a controller area network (CAN) of a printer system through a master controller or supervising module that has a file with all the possible CAN board types and information about sub networks. When a device is connected to the network it sends a message to the module indicating its presence. The Master in turn downloads a CAN address and the appropriate software to be run by that board. Software in the master controller include support for module board-to-board communication, plug and play sub-module boards, and elimination of system restart should a firmware crash occur.

In yet another aspect, the disclosed embodiment relate to a method to configure modules and sub-modules in a control area network (CAN) of a printer system by creating a memory structure containing module information and configuration information for possible modules and sub-modules; detecting the modules and sub-modules that exist in the printer system; identifying drivers for the detected modules and sub-modules from the memory structure; and configuring the detected modules and sub-modules with the identified drivers to facilitate module to module communication and sub-module to sub-module communication.

Still further aspect, the disclosed method further performs associating one or more sub-modules with one or more of the modules.

In yet another aspect, the disclosed method assigns a CAN-id to each module of the printer system and creates a memory structure that includes storing the module information and the configuration information for the detected modules and sub-modules that exist in the printer system.

In still another aspect, the disclosed method detects the modules and sub-modules by waiting for a message from a non-configured module or a non-configured sub-module. After receiving a message from a non-configured sub-module with one or more of the modules to select a driver to facilitate module to module communication and sub-module to sub-module communication.

In another disclosed embodiment, a network arrangement for controlling a printing system comprising a controller area network connecting a plurality of locations in the printing system; a module at each of the locations connected to the controller area network, each of the modules having different types of boards at each of the locations; and a master controller connected to the module at each of the locations through the controller area network, wherein the master controller executes instructions to configure the module and different type of boards at each of the locations by: creating a memory structure containing module information and configuration information for possible modules and boards; detecting the module and different type of boards at each of the locations in the printer system; identifying drivers for the detected module and different type of boards from the memory structure; and configuring the detected module and different type of boards with the identified drivers to facilitate module to module communication and board to board communication at each location.

Embodiments as disclosed herein may also include computer-readable media for carrying or having computer-executable instructions or data structures stored thereon for operating such devices as controllers, sensors, and eletromechanical devices. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

The term "printing system" as used herein refers to a digital copier or printer, image printing machine, digital production press, image reproduction machine, bookmaking machine, facsimile machine, multi-function machine, or the like and can include several marking engines, feed mechanism, scanning assembly as well as other print media processing units, such as paper feeders, finishers, and the like.

As used herein, the term "controller area network" or "control area network" (CAN) is used to describe a control bus and associated control processor typically found in printer system. For example, the CAN bus and associated CAN processor may control a variety of different functions such stacker, document feeder, marker, and input output terminals that perform various display functions such as visual, acoustic, or haptic technologies.

Figure 1:
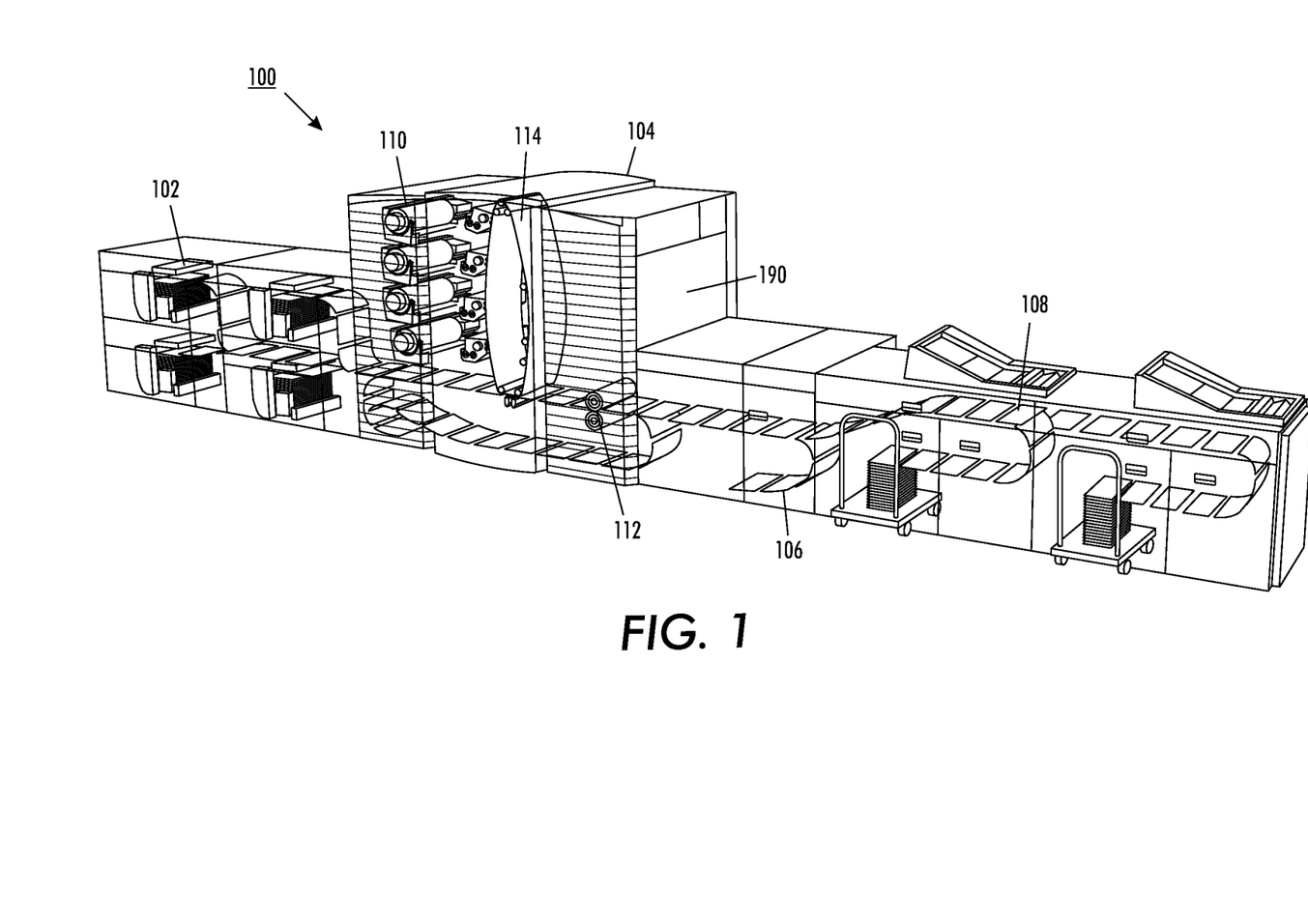
FIG. 1 is an exemplary of a printer system with a control area network (CAN) in accordance to an embodiment.

FIG. 1 is a digital production press 100, which is a large-scale production printing device capable of producing large quantities of finished documents. An example of such a system is the Nuvera 288 of Xerox or Xerox's iGen printer series. A large number of modules are distributed throughout press 100, such as a paper feeders 102 module, an imaging unit 104 module, a post process inserter 106, a document finishers 108, an input output terminal module (not shown), a master controller 190 module, and the like. For example, in the paper feeders 102, programmable devices may control the rollers that feed the paper, guides, tampers, and sensors that align the paper, detectors that indicate the paper level in the paper feeder, and the like In imaging unit 104, programmable devices may control the operation of imaging stations and image carrier 110, fuser 112, ink containers 114, as well as rollers that feed the paper and guides, tampers, and sensors that align the paper, and the like In post process inserter 106, programmable devices may control the rollers that feed the paper and the inserts, guides, tampers, and sensors that align the paper and the inserts, and the like. An imaging unit module may employs essential hardware elements such as charging corotron unit, photoreceptor cleaning devices, developer unit, fuser unit with associated heat roll and pressure roll. In document finisher 108, programmable devices may control the rollers that feed the paper, guides, tampers, and sensors that align the paper, punches that punch holes in the documents, binders that bind the pages into documents, and the like. In addition, programmable devices may perform interface functions, to provide the capability to control and administer press 100 from other systems, user interface functions, to display information to users and accept user input, and other functions.

It should be noted that press 100, shown in FIG. 1, is merely an example of a system to which the present technology may be advantageously applied. The present technology is not limited to this system and in fact, contemplates application to and implementation in any type of system in which multiple programmable devices may be programmed. Additional non-limiting examples of systems to which the present technology may be applied include xerographic or other photocopiers, paper handlers, document finishers, scanners, printers, fax machines, and the like. In addition, one of skill in the art would recognize that the present technology is not limited to implementation with programmable devices. Although, for simplicity, this document uses the term programmable device, it is to be understood that the present technology may be implemented relative to any type of software or firmware based processor, such as microcontrollers, microprocessors, computer systems, and the like, and that the term programmable device encompasses any such software or firmware based processor.

Figure 2:
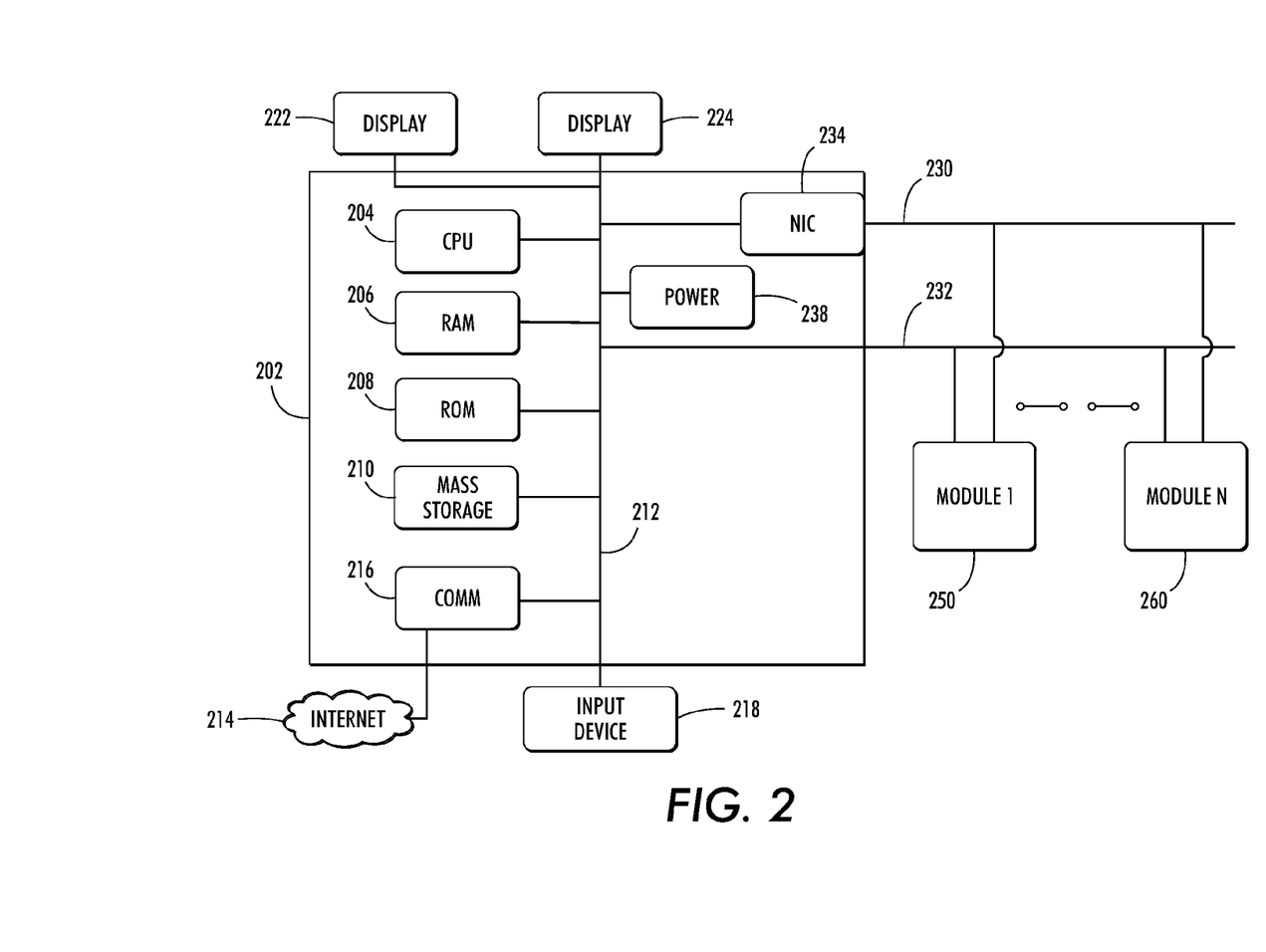
FIG. 2 is an exemplary block diagram of a master and modules in accordance to an embodiment.

An example of a programmable device programming architecture 200 for programming multiple programmable modules is shown in FIG. 2. Architecture 200 includes multiple programmable modules, which may be arranged in groups, such as programmable modules 250-260, or individually, such as programmable devices 250 and 260. The programmable modules are communicatively connected by a communication path, which may be a network, such as a standard wide area network (WAN) 232, or CAN-bus 230, and the like.

The description of FIG. 2 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 202 includes a processor 204, commercially available from Intel, Motorola, Cyrix and others. Computer 202 also includes random-access memory (RAM) 206, read-only memory (ROM) 208, and one or more mass storage devices 210, and a system bus 212, that operatively couples various system components to the processing unit 204. The memory 206, 208, and mass storage devices, 210, are types of computer-accessible media. Mass storage devices 210 are more specifically types of nonvolatile computer-accessible media and can include one or more hard disk drives, floppy disk drives, optical disk drives, and tape cartridge drives. The processor 204 executes computer programs stored on the computer-accessible media.

Computer 202 can be communicatively connected to the Internet 214 via a communication device 216. Internet 214 connectivity is well known within the art. In one embodiment, a communication device 216 is a modem that responds to communication drivers to connect to the Internet via what is known in the art as a "dial-up connection". In another embodiment, a communication device 216 is an Ethernet® or similar hardware network card connected to a local-area network (LAN) that itself is connected to the Internet via what is known in the art as a "direct connection" (e.g., T1 line, and the like).

A user enters commands and information into the computer 202 through input devices such as a keyboard 218 or a pointing device 220. The input device 218 such as a keyboard permits entry of textual information into computer 202, as known within the art, and embodiments are not limited to any particular type of keyboard. A Pointing device (not shown) permits the control of the screen pointer provided by a graphical user interface (GUI) of operating systems such as versions of Microsoft Windows®. Embodiments are not limited to any particular pointing device 220. Such pointing devices include mice, touch pads, trackballs, remote controls and point sticks. Other input devices (not shown) can include a microphone, joystick, game pad, satellite dish, scanner, or the like.

In some embodiments, computer 202 is operatively coupled to a display device 222. Display device 222 is connected to the system bus 212. Display device 222 permits the display of information, including computer, video and other information, for viewing by a user of the computer. Embodiments are not limited to any particular display device 222. Such display devices include cathode ray tube (CRT) displays (monitors), as well as flat panel displays such as liquid crystal displays (LCD's). In addition to a monitor, computers typically include other peripheral input/output devices such as printers (not shown). Speakers 224 and 226 provide audio output of signals. A speaker is also connected to the system bus 212.

Computer 202 also includes an operating system (not shown) that is stored on the computer-accessible media RAM 206, ROM 208, and mass storage device 210, and is executed by the processor 204. Examples of operating systems include Microsoft Windows®, Apple MacOS®, Linux®, UNIX®. Examples are not limited to any particular operating system, however, and the construction and use of such operating systems are well known within the art.

Embodiments of computer 202 are not limited to any type of computer 202. In varying embodiments, computer 202 comprises a PC-compatible computer, a MacOS®-compatible computer, a Linux®-compatible computer, or a UNIX®-compatible computer. The construction and operation of such computers are well known within the art.

Computer 202 can be operated using at least one operating system to provide a graphical user interface (GUI) including a user-controllable pointer. Computer 202 can have at least one web browser application program executing within at least one operating system, to permit users of computer 202 to access an intranet, extranet or Internet world-wide-web pages as addressed by Universal Resource Locator (URL) addresses. Examples of browser application programs include Netscape Navigator® and Microsoft Internet Explorer®.

The computer 202 can operate in a networked environment using logical connections to one or more remote computers, such as modules 250 & 260. These logical connections are achieved by a communication device coupled to, or a part of the computer 202. Embodiments are not limited to a particular type of communications device. The remote computer 228 can be another computer, a server, a router, a network PC, a client, a peer device or other common network node. The logical connections depicted in FIG. 2 include a local-area network (LAN) and a wide-area network (WAN) 232. Such networking environments are commonplace in offices, enterprise-wide computer networks, intranets, extranets and the Internet.

When used in a LAN-networking environment, the computer 202 and modules are connected to the local network through network interfaces or adapters 234, which is one type of communications device 216. Remote computer 228 also includes a network device 236. When used in a conventional WAN-networking environment, the computer 202 and remote computer 228 communicate with a WAN 232 through modems (not shown). The modem, which can be internal or external, is connected to the system bus 212. In a networked environment, program modules depicted relative to the computer 202, or portions thereof, can be stored in the remote computer 228. Computer 202 also includes power supply 238. Each power supply can be a battery.

Figure 3:
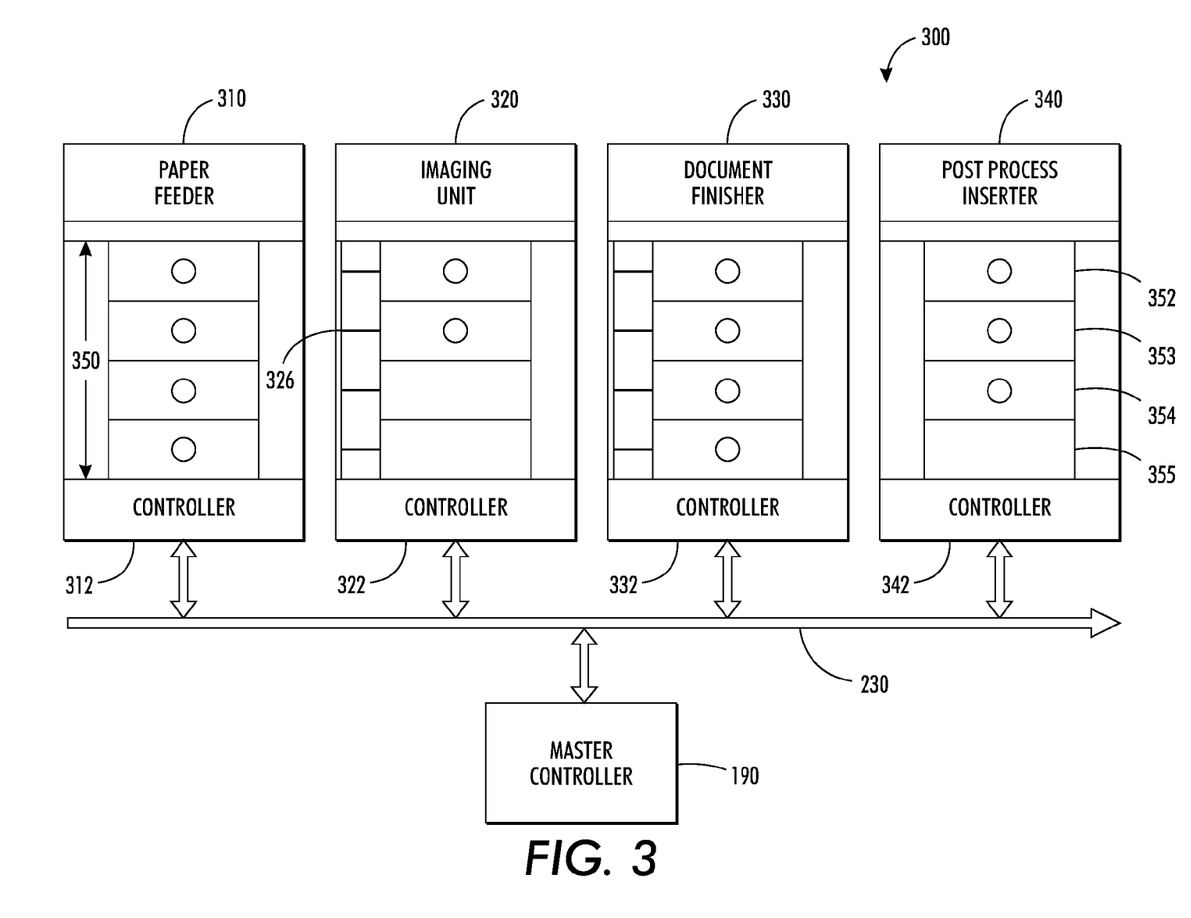
FIG. 3 shows a network arrangement for controlling a printer system in accordance to an embodiment.

FIG. 3 shows a network arrangement 300 for controlling a printer system in accordance to an embodiment. In the following description of the embodiment, although a printing system is described as a specific example for connecting modules in the network arrangement 300, the present embodiment is not limited to such a configuration and may also be applied to any other system that employs a serial data bus standard.

The network arrangement 300 includes bus-connected modules, such as an imaging unit 320, a sheet or paper feeder unit 310 (HCF, High Capacity Feeder), a document finisher 330 (High Capacity Stacker or sheet output unit), and a post process inserter 340 (High Capacity Stapler/Stacker or finisher/output unit). In addition, a master controller 190 is connected through CAN-bus 230 to the imaging unit and other modules. Master controller 190 controls bus communication between the modules. Furthermore, a client terminal (not shown) is connected to the printing system through a network, such as network communication device, and provides image data to the printing system. The imaging unit 320 may be any suitable imaging unit, including but not limited to a laser printer, an ink jet printer, a digital multifunction device, or a facsimile. Alternatively, instead of supplying image data directly to the imaging unit 320, a client terminal can be configured to supply image data to the imaging unit 320 through a print server. In addition, an image input unit (IIT, Image Input Terminal) may be bus-connected and used to supply image data to the imaging unit 320. Each module may have sub-modules 350 for performing certain functions under the control of a controller 312, 322, 332, 342. For example, in a printing system with multiple print heads each function of the sub-modules could be performed by individual boards. Sub-modules 352, 353, 354, 355 are part of the post process inserter 340 module. A module specific controller area network or sub-network (a CAN device), designated CAN2 ... CANn, may be added to link multiple boards (e.g., network 326) together within the module. The multiple boards can communicate with each other so as to perform the desired function. The master controller 190 contains a machine file with all the possible CAN board types and information about sub-networks (CAN1 . . . CANn). This file contains ordered information that allows software running in the master controller 190 to analyze the CAN-Network to pick out the modules in the network and their associated sub-boards.

Figure 4:
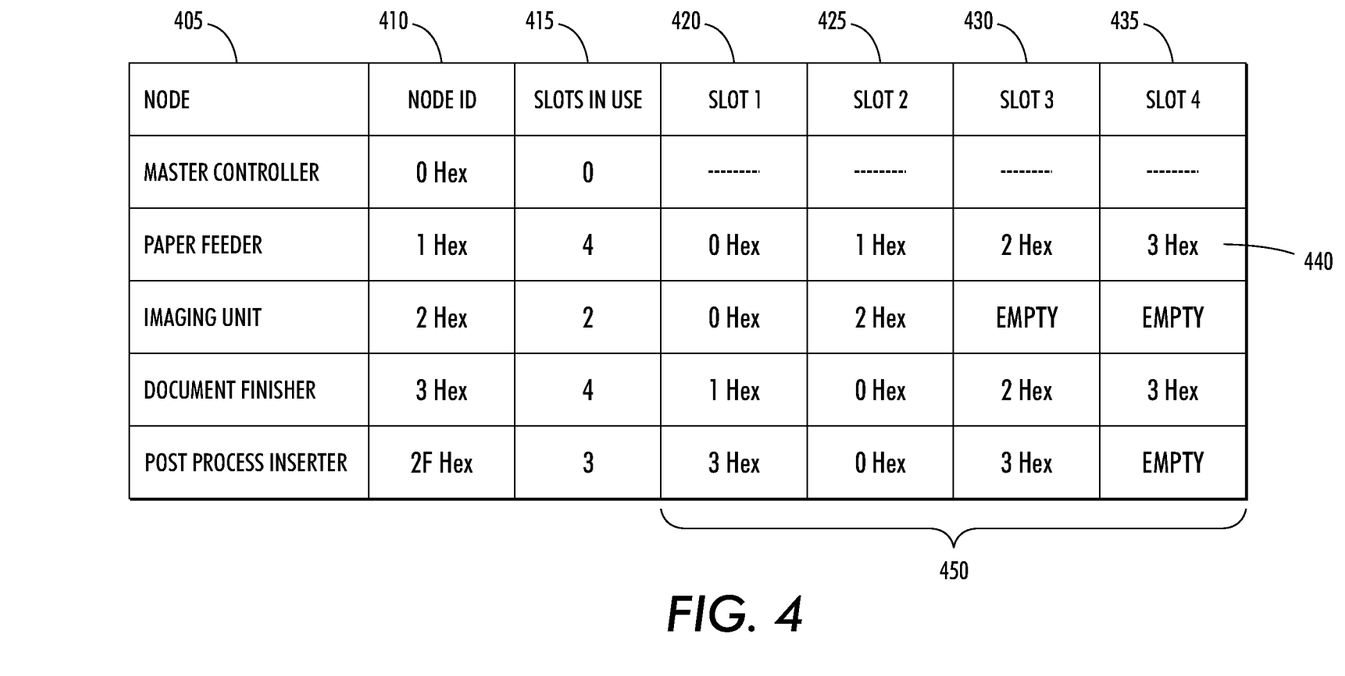
FIG. 4 shows a table of node IDs representing priorities of respective modules in a printer system in accordance to an embodiment.

FIG. 4 shows a table of node IDs 400 representing priorities of respective modules in a printer system in accordance to an embodiment. The modules in the printer system are each assigned to a node 405 of the CAN network. After bus-connected module units begin operating, the master controller assigns predetermined unique node IDs to the respective modules. As shown in the table, a node ID 410 with a smaller numerical value is assigned to a unit having a higher priority in the system. According to the present embodiment, an order of priorities is defined such that the master controller has a node ID with the highest priority ("0" in hex) and the finisher/inserter modules have node IDs with the lowest priority ("47" in hex). The table also shows the number of slots (420, 425, 430, 435) that are available in each module to create a localized CAN network (CAN1 . . . CANn). Column 415 shows how many of the available slots are being used by each of the module. For example, imaging unit is only employing 2 sub-modules but could be upgraded to four slots based on the application. Each slot forms a corresponding CAN network 450, for example, the paper feeder CAN network 440. Further, note that slot1 420 is the master controller and has the highest priority in the paper feeder module. Slot 2 is the master controller for the document finisher.

FIG. 5 is a diagram illustrating an XML machine data file 500 in accordance to an embodiment The machine data file containing module information and possible configuration information such that the master controller or any computer coupled to the CAN network can detect the correct number of modules and their associated sub-boards. The illustrated machine data file is shown as an XML file 500 with fields directed to the module type 505, module configuration 510, mainboard information 520, and module configuration 530. In particular, the XML file shows that a Module contains a set of possible configurations. For example, the module "Feeder" has a "Four-Tray" configuration 520 and a "Two-Tray" configuration 530. This allows the system to detect different board sets as well as dynamically choose which executables belong on the firmware as shown in configurations 520 and 530. The SubBoardld field, see fields 520, 530, 540 and 550, configures the printing system for within module board-to-board communication. This is particularly useful for systems that require very low-level controls where the master controller 190 is not involved in the details of the control system. Despite the dynamic identifiers for each module, the SubBoardld can be masked off the full CAN-ID such that a particular board can communicate to another board within its module.

Figure 6:
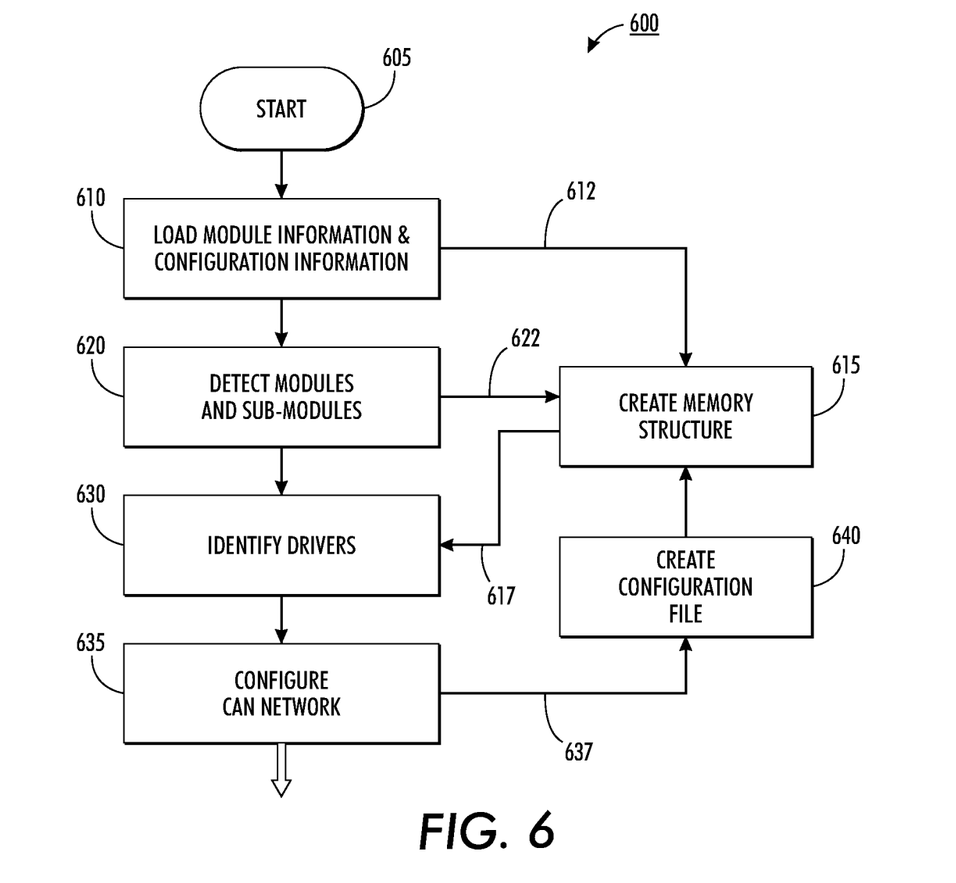
FIG. 6 is a flowchart of a process to configure modules and sub-modules in a control area network (CAN) of a printer system in accordance to an embodiment.

FIG. 6 is a flowchart of a process 600 to configure modules and sub-modules in a control area network (CAN) of a printer system in accordance to an embodiment. Process 600 detects and dynamically allocates the correct executable for hardware that actually exists in the network arrangement of the printing system. Process 600 begins with action 605. Action 605 is initiated during an autoconfiguration process or when the printing system is restarted. After the action 605 control passes to action 610 for further processing. In action 610, module information and configuration information for possible modules and sub-modules for the printing system is loaded for used during the configuration process. The information is kept in permanent storage such as mass storage 210 until is needed by the main controller for the CAN network. The loaded information is passed 612 to action 615 for further processing. In action 615, a memory structure containing module information and configuration information is created. The created memory structure can be located in the main memory of computer hardware 200 and is created and maintained by the configuration manager in a designated module of the CAN network such as master controller 190. Each Module and sub-module element may include a designated placed within the memory, the I/O start and end locations, and a pointer to linked list containing the configuration information for each module and sub-module. The application to other various architectures and operating systems will require that the creation of a memory structure account for the specific requirements of those systems such as memory allocation and configuration information as will be recognized by those of ordinary skill in the art.

In action 620, the modules and sub-modules that exist in the printing system are determined. By allowing for optional boards in the printing system, process 600 can detect which boards exist and dynamically allocate the correct parts of the modules and sub-modules that actually exist in the network. This machine file contains ordered information that through executable instructions directs a processor to analyze the CAN network to pick out the modules in the attached to the network. This solves the need in the art for printing systems that have optional numbers of stations. The detected modules and sub-modules are then passed 622 to the created memory structure so as to be used with the module information and configuration information for possible modules and sub-modules. The module information and the configuration information for the existing modules and sub-modules are then passed 617 to action 630 for further processing. In action 630, the drivers or executables belonging on the firmware for the modules and sub-modules are identified. The identified drivers are used in action 635 to configure the CAN network. Action 630 configures the detected modules and sub-modules with the identified drivers (executables) to facilitate module to module communication and sub-module to sub-module communication. The configuration information is then sent to action 640 where a configuration file is generated and saved in the memory structure created in action 615. It should be noted at this point that the created memory structure has three distinct files in place. The first file, contains module information and possible configurations such that the system can detect the correct number of modules and their associated sub-boards. The second file is ordered information about all modules and all sub-modules that exist in the network. Lastly, the third file is the configuration file for the CAN network.

Figure 7:
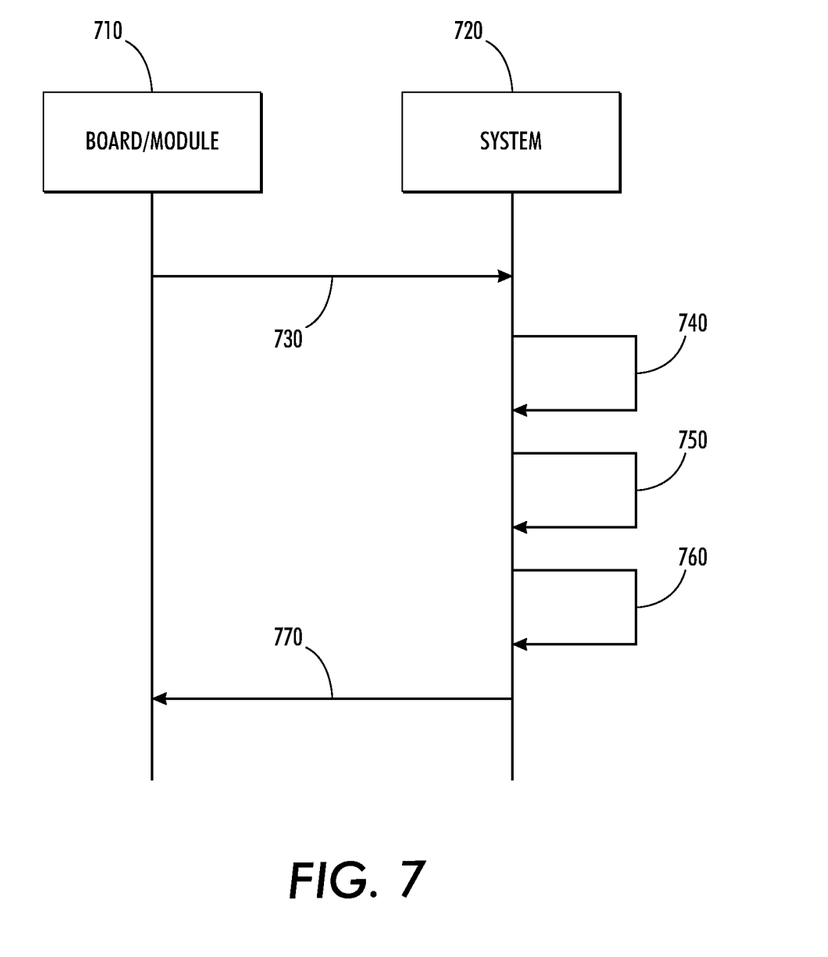
FIG. 7 is an illustration of a non-configured board/module adding sequence in accordance to an embodiment.

FIG. 7 is an illustration of a non-configured board/module adding sequence 700 in accordance with an embodiment. A non-configured module or a non-configured sub-module 710 sends a message to the system 720 or main controller such as master controller 190 of FIG. 3. In response to the received message the system 720 queues a configuration process 740 to determine the identify and in the case of a sub-module which module it belongs to 750. The process associates from the message the non-configured sub-module with one or more of the modules in order to select the correct executable. After identifying the identity and/or associating, the process then configures 770 the non-configured module or the non-configured sub-module with a driver to facilitate module to module communication and sub-module to sub-module communication. The configuration file is then updated with the new module or sub-module identification.

Although specific embodiments of the present technology have been described, it will be understood by those of skill in the art that there are other embodiments that are equivalent to the described embodiments. Accordingly, it is to be understood that the technology is not to be limited by the specific illustrated embodiments, but only by the scope of the appended claims.

What is claimed is:

1. A method to configure modules and sub-modules in a control area network (CAN) of a printer system, the method comprising:
   creating a memory structure containing module information and configuration information for possible modules and sub-modules, wherein a module is at least one of feeder, marker, finisher, input output terminal, or stacker module;
   detecting the modules and sub-modules that exist in the printer system;
   identifying drivers for the detected modules and sub-modules from the memory structure;
   configuring the detected modules and sub-modules with the identified drivers to facilitate module to module communication and sub-module to sub-module communication; and
   associating one or more sub-modules with one or more of the modules,
   wherein the detecting of the modules and sub-modules includes waiting for a message from a non-configured module or a non-configured sub-module.

2. The method according to claim 1, wherein configuring comprises assigning a CAN-id to each module of the printer system.

3. The method according to claim 1, wherein the creating a memory structure includes storing the module information and the configuration information for the detected modules and sub-modules that exist in the printer system.

4. The method according to claim 3, wherein a format for the storing of the module information and the configuration information is selected from a group consisting of XML, HTML and ASCII text.

5. The method according to claim 1, further comprising associating from the message the non-configured sub-module with one or more of the modules.

6. The method according to claim 5, further comprising configuring a non-configured module or a non-configured sub-module with a driver to facilitate module to module communication and sub-module to sub-module communication.

7. A network arrangement for controlling a printing system comprising:
   a controller area network connecting a plurality of locations in the printing system;
   a module at each of the locations connected to the controller area network, each of the modules having different types of boards at each of the locations; and
   a master controller connected to the module at each of the locations through the controller area network, wherein the master controller executes instructions to configure the module and different type of boards at each of the locations by:
      creating a memory structure containing module information and configuration information for possible modules and boards, wherein a module is at least one of feeder, marker, finisher, input output terminal, or stacker module;
      detecting the module and different type of boards at each of the locations in the printer system;
      identifying drivers for the detected module and different type of boards from the memory structure;
      configuring the detected module and different type of boards with the identified drivers to facilitate module to module communication and board to board communication at each location; and
      associating the module with the boards at each of the locations,
      wherein the detecting of the modules and boards includes waiting for a message from a non-configured module or a non-configured board.

8. The network arrangement according to claim 7, wherein configuring comprises assigning a CAN-id to each module of the printer system.

9. The network arrangement according to claim 7, wherein the creating a memory structure includes storing the module information and the configuration information for detected modules and boards that exists in the printer system.

10. The network arrangement according to claim 7, further comprising associating from the message the non-configured board with one or more of the modules.

11. The network arrangement according to claim 10, further comprising configuring a non-configured module or a non-configured board with a driver to facilitate module to module communication and board to board communication.

12. A non-transitory computer-accessible medium having executable instructions to configure modules and sub-modules in a control area network (CAN) of a printer system, the executable instructions, when executed by a processor, cause the processor to execute a method comprising:
   creating a memory structure containing module information and configuration information for possible modules and sub-modules, wherein a module is at least one of feeder, marker, finisher, input output terminal, or stacker module;
   detecting the modules and sub-modules that exist in the printer system;
   associating one or more sub-modules with one or more of the detected modules;
   identifying drivers for the detected modules and sub-modules from the memory structure; and
   configuring the detected modules and sub-modules with the identified drivers to facilitate module to module communication and sub-module to sub-module communication,
   wherein the detecting of the modules and sub-modules includes waiting for a message from a non-configured module or a non-configured sub-module.

13. The non-transitory computer-accessible medium of claim 12, further comprising associating from the message the non-configured sub-module with one or more of the modules.

14. The non-transitory computer-accessible medium of claim 13, further comprising configuring a non-configured module or a non-configured sub-module with a driver to facilitate module to module communication and sub-module to sub-module communication.

15. The non-transitory computer-accessible medium of claim 12, wherein the creating a memory structure includes storing the module information and the configuration information for the detected modules and sub-modules that exist in the printer system.

* * * * *